E. WITZENMANN.
METALLIC HOSE.
APPLICATION FILED JULY 31, 1906.

910,104.

Patented Jan. 19, 1909.

WITNESSES

INVENTOR
Emil Witzenmann
BY
ATTYS

UNITED STATES PATENT OFFICE.

EMIL WITZENMANN, OF PFORZHEIM, GERMANY.

METALLIC HOSE.

No. 910,104.  Specification of Letters Patent.  Patented Jan. 19, 1909.

Application filed July 31, 1906. Serial No. 328,566.

*To all whom it may concern:*

Be it known that I, EMIL WITZENMANN, manufacturer, a subject of the Grand Duke of Baden, residing at No. 48 Holzgartenstrasse, Pforzheim, German Empire, have invented new and useful Improvements in Metallic Hose, of which the following is a specification.

My invention has reference to metallic hose, such as is employed for brake pipes and other purposes, and consisting of an internal flexible metal pipe protected by a rubber cover, whereby the joints are rendered airtight.

The improvements forming the subject of my present invention relate to the means of strengthening such hose, so as to render it better able to withstand high internal pressure and to resist external injury; and also to more effectual means of securing the rubber cover to the metal pipe, whereby loosening of the assembled parts is prevented.

To attain the objects in view I armor the rubber cover with wire-work or metallic gauze, around which stout metal wire is coiled, the whole being then protected by an external covering of suitable pliable material.

At each end of the hose I supply a conical nipple which fits over the metal pipe and into the rubber cover; and around the latter I apply a thimble having an external thread to receive the union of the hose-coupling, whereby the assembled parts are all firmly held together. To prevent the wirework sheathing of the rubber cover from being forced into the substance of the latter, I provide between the wirework and the rubber a collar, preferably of conical shape. This collar also serves, in those cases where the sheathing is dispensed with, to prevent the thimble, when being screwed up, from dragging directly on the rubber cover and twisting the latter around with it. In order to hinder possible accidental slackening of the parts, there may be screwed on the threaded thimble a lock-nut, which when the parts are tightened up lies closely against the end of the coupling union.

My invention is illustrated in the accompanying drawing, in which—

Figure 1:
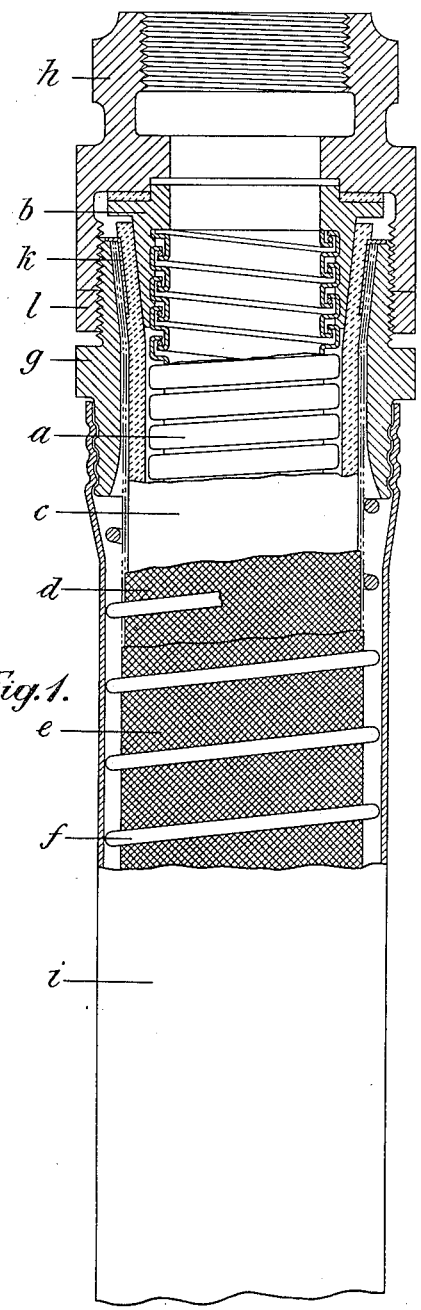
Figure 2:
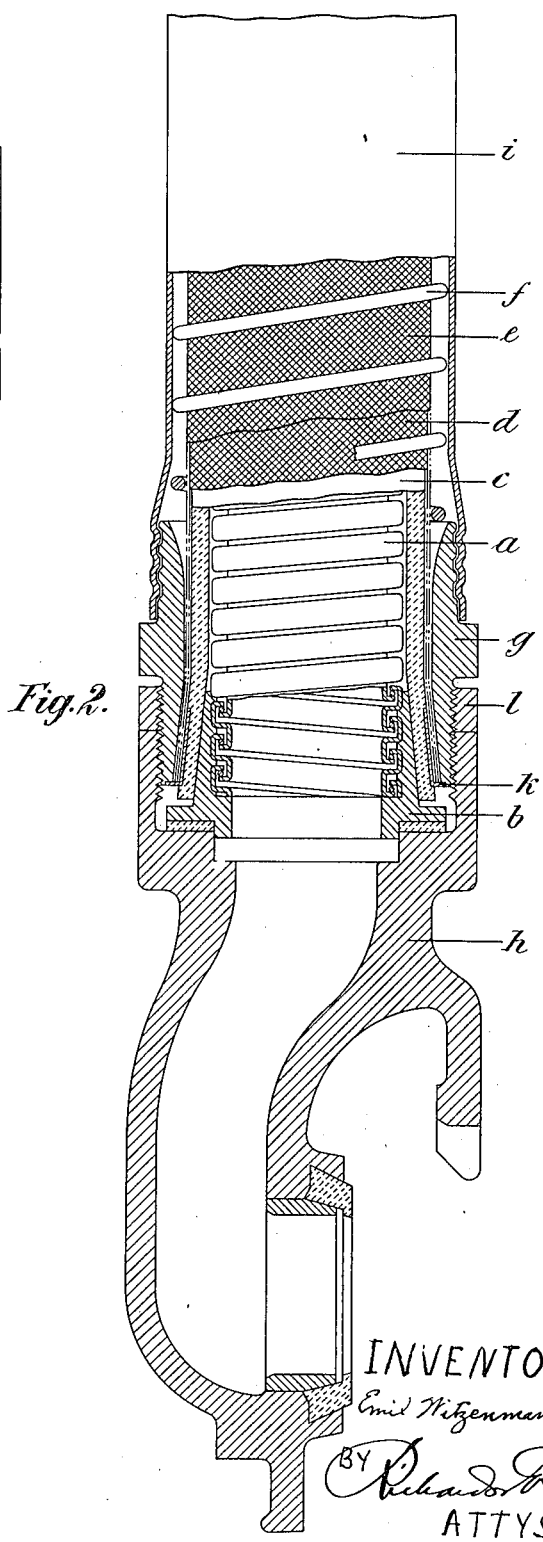

Figure 1 shows a longitudinal section and part elevation of the one end of a coupling-hose, and Fig. 2 a like view of the opposite end.

$a$ is the metallic hose, provided at both ends with a conical nipple $b$ and clothed with an indiarubber cover $c$. The latter is sheathed with wirework, consisting preferably of two layers of metal gauze $d\ e$, which are bound with wire $f$. At each end of the hose is a thimble $g$ which fits over the sheathed rubber cover $c$ and nipple $b$ and is screw-threaded to receive the threaded socket of the union $h$ of the coupling. When, then, the members $g\ h$ are screwed up, the rubber cover $c$ is pressed tightly against the nipple $b$ and the whole assemblage of parts is firmly held together.

$i$ is a fabric or other pliant covering serving to protect the actual hose and preferably bound with wire or the like to the ends of the thimble $g$, which may be grooved to afford it a better hold.

$k\ k$ are conical collars applied, one at each end of the hose, between the wire gauze $d$ and the cover $c$, so that when the members $g\ h$ are screwed up, the gauze can not cut into the rubber. Or in the event of the wire gauze sheathing being dispensed with, the collars $k\ k$ serve to prevent twisting of the rubber cover $c$ on screwing together of the union and thimble.

$l$ is a jam-nut screwed upon the thimble $g$ and serving to lock the parts against accidental loosening.

Having thus described my invention, what I claim as new and desire to secure by United States Letter Patent is:—

A hose coupling, comprising, in combination, a flexible metal pipe, a rubber cover on the same, wirework sheathing the cover, wire bound round the sheathing, a nipple which receives the end of the pipe internally and the cover externally, an externally threaded thimble applied around the cover and nipple, a union screwed over the thimble and receiving the nippled hose end and pressing the assembled parts together, and a pliable casing attached to the thimble and protecting the wire sheathed and bound hose, substantially as described.

In witness whereof I have hereunto signed my name at Stuttgart this seventeenth day of July 1906, in the presence of two subscribing witnesses.

EMIL WITZENMANN.

Witnesses:
AD. G. HUNNBURG,
ERNST ENTENMANN.